US006235320B1

(12) United States Patent
Daravingas et al.

(10) Patent No.: US 6,235,320 B1
(45) Date of Patent: May 22, 2001

(54) COLORED MULTI-LAYERED YOGURT AND METHODS OF PREPARATION

(75) Inventors: George V. Daravingas, Edina; Timothy C. Heitke, Long Lake; Dean F. Funk, Brooklyn Park, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 08/254,457

(22) Filed: Jun. 6, 1994

Related U.S. Application Data

(63) Continuation of application No. 07/881,287, filed on May 11, 1992, now abandoned.

(51) Int. Cl.[7] .................................................. A23C 9/12
(52) U.S. Cl. ............................ 426/34; 426/42; 426/573; 426/583
(58) Field of Search .................... 426/34, 43, 583, 426/42, 104, 106, 130, 573, 576, 578, 580

(56) References Cited

U.S. PATENT DOCUMENTS

| | | | |
|---|---|---|---|
| 3,269,842 | * 8/1966 | Mayer et al. | 426/43 |
| 3,932,680 | * 1/1976 | Egli et al. | 426/34 |
| 4,225,623 | * 9/1980 | Stussi | 426/43 |
| 4,235,934 | * 11/1980 | Egli et al. | 426/43 |
| 4,410,549 | 10/1983 | Baker | 426/43 |
| 4,430,349 | 2/1984 | Malone et al. | 426/34 |
| 4,797,289 | 1/1989 | Reddy | 426/43 |
| 4,837,035 | 6/1989 | Baker et al. | 426/43 |
| 4,837,036 | 6/1989 | Baker et al. | 426/43 |
| 4,952,414 | 8/1990 | Kaufman et al. | 426/43 |
| 5,037,550 | 8/1991 | Driessen et al. | 426/43 |

FOREIGN PATENT DOCUMENTS

| | | | |
|---|---|---|---|
| 62-190043 | * 8/1987 | (JP) . | |
| 1-016553 | * 1/1989 | (JP) | 426/34 |

OTHER PUBLICATIONS

Orii et al., Patent Abstracts of Japan, 1989, 01–16553.*
Food Processing, Oct. 1989, pp. 130–140.

* cited by examiner

Primary Examiner—Leslie Wong
(74) Attorney, Agent, or Firm—John A. O'Toole; Douglas J. Taylor; Richard E. Fichter

(57) ABSTRACT

Disclosed are yogurt products having a plurality of layers, portions or regions, each having a discrete color and containing comprising a stirred style yogurt. The layers are in direct physical contact and do not have an intermediate barrier. The yogurt layers are relatively high in viscosity (15,000 to 30,000 cps) and the difference in viscosity between portions is less than about 3,000 cps. Those yogurt layers having a color essentially contain selected non-bleeding colorants and, optionally, naturally colored ingredients such as fruit puree. Bleeding/migration of colorants between layers and mixing upon handling is minimized by selecting viscosity and colorants.

26 Claims, 1 Drawing Sheet

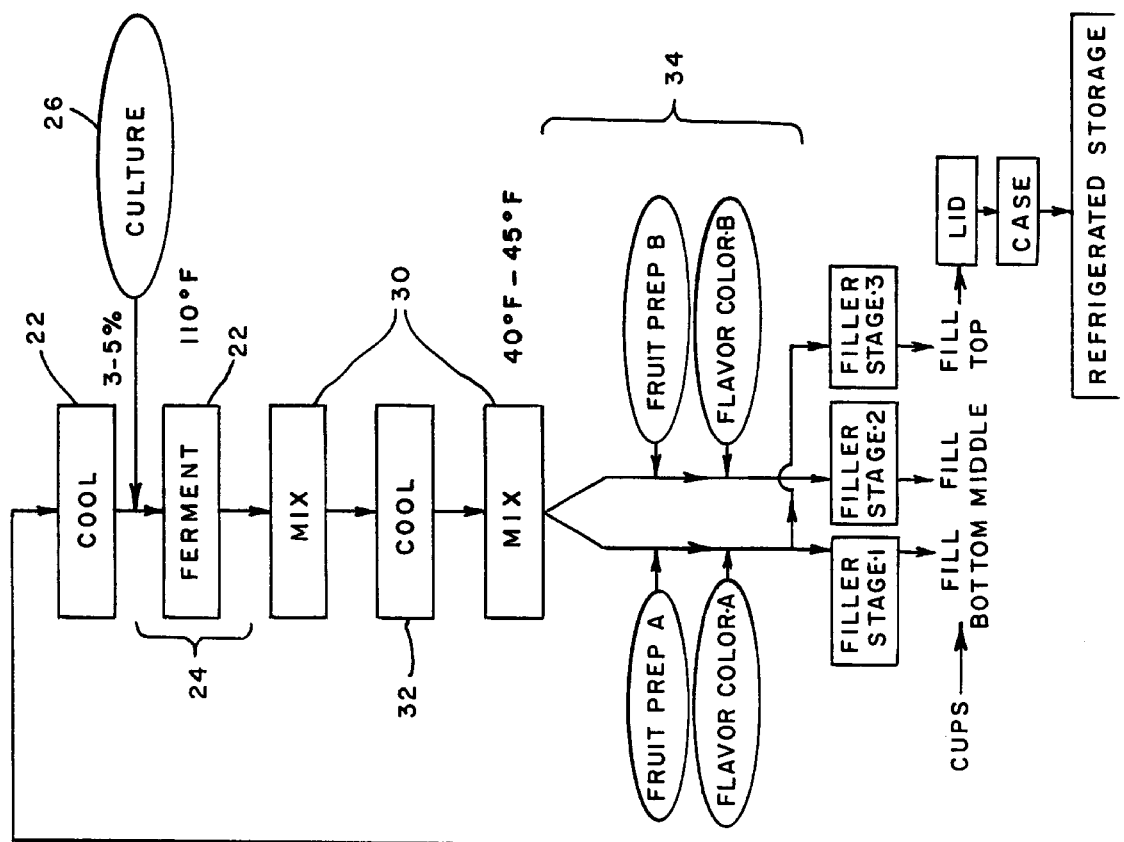
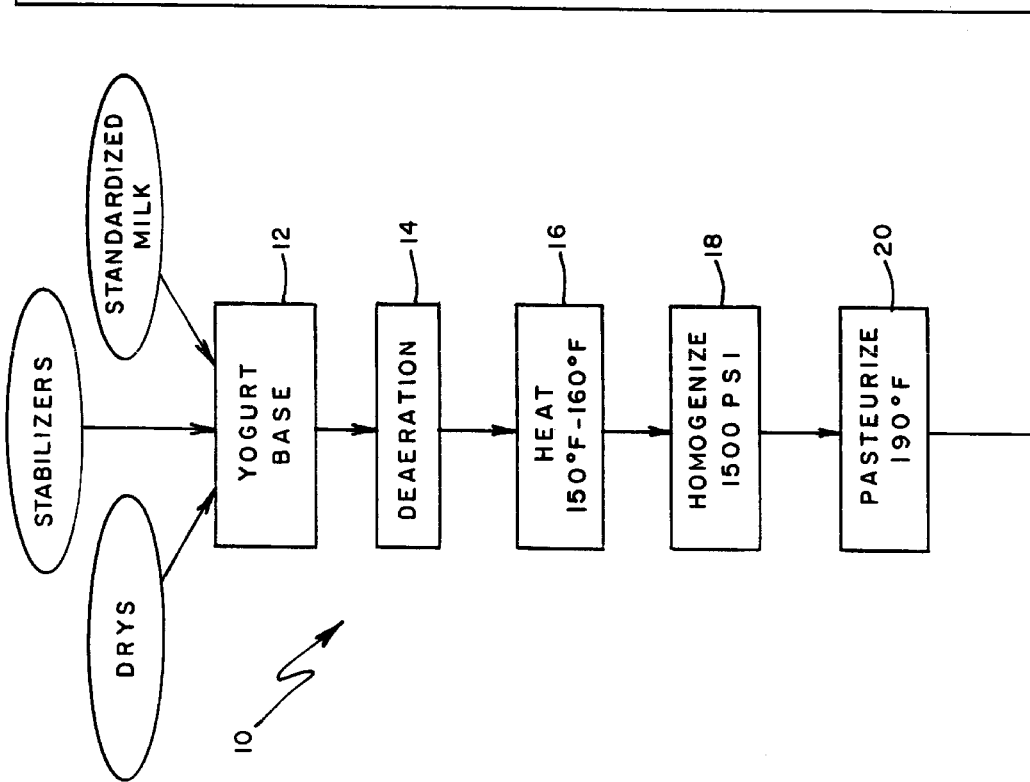

COLORED MULTI-LAYERED YOGURT AND METHODS OF PREPARATION

This is a continuation application Ser. No. 07/881,287 filed on May 11, 1992, now abandoned.

FIELD OF THE INVENTION

The present invention relates to food products and to their methods of preparation. More particularly, the present invention relates to dairy products, especially cultured or fermented dairy products such as yogurt and to their methods of preparation.

BACKGROUND OF THE INVENTION

Yogurt is a nutritious dairy product which recently has become quite popular. At retail, yogurt is now available in a wide assortment of varieties of texture, fat content and flavor among other attributes. Other than aseptically packaged yogurt, yogurt is traditionally distributed and consumed with a live culture which requires refrigerated distribution.

From a yogurt manufacturing process standpoint, all fruit containing yogurts fall into one of two styles; namely, 1) set yogurts, and 2) stirred style. Within these broad two classifications, numerous yogurt varieties exist.

In the set style, the "yogurt" is charged to its container and allowed to set or increase in viscosity and/or ferment. Usually, an inoculated milk base is charged to the container and allowed to ferment in situ at warm temperatures of about 40° to 50° C. After the desired maturing time, the product is cooled which arrests the culturing activity and also allows the body to set to form the gel-type texture. Set style yogurts have a relatively low initial viscosity (i.e., upon filling of its food package container) and a higher temperature ("temperature of filling") compared to the viscosities of stirred style yogurt products. As the product cools and ferments, its viscosity increases to its final viscosity value. A set style yogurt is characterized by a more firm, gel-like consistency and a higher final viscosity than most stirred style yogurts. In addition to the natural thickening effect of the yogurt culture, a wide variety of thickeners and stabilizers are taught as useful to supplement the yogurt's gel characteristics.

Of course, within this set style, there is a continuum of body firmness. Most set custard style products have quite firm gels although some others are much softer. One variety of a set style yogurt is a "custard" style yogurt. The softer gel products may even be perceived by the consumer as being thinner than even certain stirred style products.

One popular style variant of custard style yogurt is fruit-on-the-bottom, also colloquially referred to as "sundae" style, in which a discrete layer of fruit preserves is on the bottom of the yogurt container and the custard yogurt fills the rest of the container. The fruit preserves have a higher density than the yogurt. Since the yogurt in set style products is still liquid upon charging to the container, the relatively more dense fruit preserves are thus then generally charged first to the container at its bottom and the lighter liquid unset yogurt added thereupon. The yogurt is then allowed to ferment, cool, and set on the top of the fruit preserve. Fruit on the top style products are similarly prepared, except that the containers are typically inverted after having been allowed to set. Typically, the yogurt phase is unflavored, although occasionally sweetened, and of a white or natural color. This white color is in contrast to the separate fruit preserve layer which often contains additional coloring supplemental to that coloring provided by the ingredients of the fruit preserves. Other than for moisture equilibration, the yogurt layer and the fruit preserve layer usually do not intermix over time due to specific growth difference and the binding effect of pectin in the fruit preserves.

Still another variation of the custard style yogurt is what has sometimes colloquially been referred to as "western" or "California" style yogurt which generally is a custard style yogurt with a discrete layer of fruit preserves on the bottom, but wherein the custard yogurt additionally contains a water soluble, natural colorant corresponding to the color of the fruit preserves. Thus, in a product having a strawberry fruit preserve bottom layer, the custard yogurt layer or phase may additionally comprise modest levels of red colorant sufficient to give the yogurt phase a pink color complimentary of the red fruit preserve layer. Frequently, both phases have added water soluble colorants.

In the second general category of yogurt products, the yogurt is of a stirred type. In stirred yogurts, the yogurt is fermented in bulk prior to filling the individual food package container. Thus, the stirred style yogurt typically has a higher viscosity than set style yogurts upon filling due to the lower temperature and the thickening affect of yogurt culture. Nonetheless, the stirred style yogurt typically builds or increases substantially in viscosity after filling over time until reaching its intended finish viscosity. Of course, stirred yogurts also come in various styles and product variations.

Most commonly, fruit preserves or purees are stirred into the stirred yogurt. Such stirred style yogurts comprising intermixed fruit purees are sometimes referred to most frequently as "Swiss" style or, less frequently but equivalently as "Continental" or "French" style. Occasionally, stirred Swiss style yogurts are formulated with excessive amounts of stabilizers with the result that after upon refrigerated storage for 48 hours, the yogurt possesses a solid-like consistency, somewhat reminiscent of custard style yogurt. Such texturally similar products generally result when one manufacturer (whose plants are designed to produce one type of yogurt) desires to produce a product competing with another manufacturer (whose plant is designed to produce the other yogurt type).

More recently, a variation of Swiss style has been marketed that additionally comprises an admixture of nuts and/or partially puffed cereal grains uniformly dispersed through the yogurt. This yogurt mixture is sometimes referred to as "breakfast" style yogurt. The partially puffed grains and nut pieces give a pleasingly mixed organoleptic texture which is both chewy and crunchy in addition to the creamy mouthfeel of stirred yogurt.

Notwithstanding the descriptions of styles given above, such characterizations are only generalizations. Thus, occasionally the prior art will contain a description of, e.g., "western" style yogurt which description may not be exactly as described above. However, the various style names used herein will refer to variants as described above.

As can be appreciated from the above description of the numerous styles and flavors within styles of yogurts, product proliferation and differentiation is an important characteristic of commercial yogurt manufacture. In this highly competitive food product category, there is a continuing desire to develop novel products having distinctive visual, taste, and textural variations in order to stimulate interest in yogurt sales. In particular, it is believed that many consumers will find visually attractive yogurts having distinct regions or layers of different colors but having the texture attributes of a stirred style yogurt. That is, there is an interest in providing a yogurt product comprising a discrete region or portion of one color of a stirred style yogurt and a second region or portion of a different color also comprising a stirred style yogurt. Otherwise stated, there is a need for a stirred style yogurt in a form reminiscent of or competitive with sundae style which is in the form of visually distinct layers.

Three primary difficulties are presented by the development of such a multi-colored product characterized by having discrete layers of color and/or flavor but wherein each phase comprises a stirred style yogurt which problems are particular to stirred style manufacturing.

First, when employing stirred style yogurts, it is very difficult to fill a stirred or fluid yogurt into a cup and advance that cup to a second station wherein the second differently colored yogurt is added to the container. This problem is particularly severe in commercial yogurt product preparation requiring high filling line speeds (e.g., over 40 per minute) such as characteristic of mass production. That is, since the bottom layer is stirred or liquid, the addition of a second, disparately colored overlaying layer of a liquid, cause the two liquid portions immediately to intermix resulting in color blending. Of course, this problem is aggravated when the number of layers is increased so as to have three, four or even more layers.

Second, since the layers are not set as in a custard style yogurt, normal handling can cause the individual stirred style yogurt portions or layers to intermix.

As the skilled artisan will appreciate, the problems associated with providing a multi-layered stirred style yogurt are different from and more challenging than providing a multiple layered custard style product. This is particularly true when the custard style product comprises only two layers and when the layers are compositionally different, e.g., a sundae style yogurt comprises a yogurt layer and a fruit preserve layer.

Still a third problem is that even if it is possible to prepare such a multi-layered stirred style product having each layer of a different color, upon extended storage the color from one layer will tend to migrate or bleed into adjacent layers, leading to a uniformly colored product or large areas of shading of colors.

Given the state of the art in the provision of dairy products, there is a continuing need for new and useful ways to provide stirred style yogurts that are visually attractive.

Another object of the present invention is to provide stirred style yogurts in the form of layers having discrete color to form a multi-layered yogurt product.

Still another object of the present invention is to prepare a multi-layered yogurt product wherein the layers or regions exhibit reduced interphase color and flavor migration.

Still another object of the present invention is to provide multi-phase colored yogurts exhibiting increased resistance to interphase mixing upon normal handling.

Still another object is to provide improved stirred style yogurt products in the form of multiple layers of discretely colored yogurt which layers exhibit minimal interlayer in color bleeding and migration.

Still another object is to provide improved methods for preparing stirred yogurt products in the form of multiple, discretely colored layers exhibiting flatter boundries between layers.

Surprisingly, the above limitations and difficulties have now been overcome and the present invention satisfies the above objectives and a long felt need to develop yogurt products in the form of multiple layers or regions of different color which exhibit minimal color migration or bleeding between layers or regions and minimal yogurt gel destabilization problems. The present yogurt products are fortified with selected stabilizers to provide filling and final viscosities within specified ranges and ratios of viscosities between the layers.

DESCRIPTION OF THE DRAWINGS

FIG. 1 is a block flow diagram showing the steps, in schematic form, for carrying out another aspect of my process invention.

SUMMARY OF THE INVENTION

The present invention resides in yogurt products in the form of discrete phases of stirred style yogurt wherein each phase is visually distinct in color. Surprisingly, the phases are in direct physical contact without the need for an intermediate barrier.

The present yogurt products comprise a plurality of stirred style yogurt portions or layers each having sufficient amounts of selected stabilizers so as to provide a filling viscosity at filling temperatures ranging between 15,000 to 30,000 cps and a finish viscosity of about 20,000 to 30,000 cps, (i.e., 24 hours after filling). The difference in filling viscosities between the two layers is essentially less than 3,000 cps.

The selected stabilizers essentially include a blend of gelatin and modified waxy maize high amylopectin starches. The gelatin comprises about 0.1% to 0.8% of the yogurt. The starch comprises about 1.5% to 3% of the yogurt.

The yogurt further essentially includes selected non-bleeding water soluble colorants that minimize color migration between layers during quiescent storage. The colorants are selected from FD&C colorants, oil soluble colorants and mixtures thereof.

In its broadest method aspect, the present invention resides in methods for manufacturing stirred style yogurt products with multiple layers. The methods include incorporating into the yogurt base or yogurt, sufficient amounts of selected stabilizers so as to provide a filling or initial viscosity at filling temperatures ranging between 15,000 to 30,000 cps and a finish viscosity of about 20,000 to 30,000 cps, (i.e., 24 hours after filling). The difference in filling viscosities between the two layers is essentially less than 3,000 cps.

DETAILED DESCRIPTION OF THE INVENTION

In its product aspect, the present invention relates to improved yogurt products having multiple phases or layers of different colors. In its method aspect the present invention resides in methods for preparing such multiple layered products. Each of these composition ingredients and features, as well as yogurt product preparation and use are described in detail below.

Throughout the specification and claims, percentages are by weight and temperatures in degrees Fahrenheit unless otherwise indicated.

The present products essentially comprise a casein based high moisture or high water activity material in the form of a thickened fluid, especially yogurt. Yogurt, of course, is well known and the art is replete with teachings of useful yogurt compositions and preparation techniques. The skilled artisan will have no difficulty selecting suitable yogurt compositions and preparation methods for use in the present invention. A good general description of yogurt manufacture is given in U.S. Pat. No. 4,797,289 (issued Jan. 10, 1989 to Reddy) which is incorporated herein by reference.

Very generally, however, yogurt comprises a cultured milk product produced by culturing one or more dairy ingredients that are combined to form a yogurt base with a characterizing bacterial culture containing *Lactobacillus bulgaricus*, a lactic acid-forming rod-shaped bacterium, and *Streptococcus thermophilus*, a coccus-shaped bacterium able to grow and produce lactic acid at high temperatures. The culture may optionally comprise additional culture specie(s) as is known in the art such as *Lactobacillus acidophilus* and/or *bifidus*.

Yogurt products are further described in those current U.S. Food & Drug Administration standards of identity for refrigerated yogurt that were promulgated in September 1982, effective Jul. 1, 1985, specifically 21 Code of Federal Regulations §131.200, 0.203 and 0.206.

The dairy ingredients which collectively comprise the yogurt base are first blended to form a yogurt base and optionally deaerated, heated and homogenized. The yogurt base is then essentially pasteurized at high temperatures and then cooled to culturing temperatures of about 40° to 50° C. (apx. 110° F.). Thereafter, the pasteurized, cooled yogurt base so formed is then inoculated with the culture and then fermented to a desired acid content or titratable acidity and pH, e.g., 4.1 to 4.7, at which curdling or coagulation occurs which forms the yogurt. Acid development and bacterial growth are then arrested by cooling the mixture, generally to a filling temperature of about 0° C. to about 15° C., preferably 0° to 5° C. and storing at these refrigeration temperatures.

As can be appreciated from the above general description, the process for the preparation of stirred style yogurt differs from that of the preparation of custard style in that the fermentation step is practiced prior to packaging, typically in large vessels with very mild agitation.

Formulating a Yogurt Base

Referring now to FIG. 1, there is shown a highly schematic process flow diagram for one highly preferred embodiment of the present method of preparation. In FIG. 1, the present process is generally designated by reference numeral 10. More particularly, the first essential step of one particular embodiment of the present method of yogurt product preparation is formulating a particular or "standardized" yogurt base indicated by reference numeral 12. The particularly formulated yogurt base is essentially distinguished by having sufficient amounts of selected thickeners in essential combination such that the resultant cultured yogurt has the requisite essential viscosity at filling temperatures and acidities yet will not develop an excessive final viscosity after resting after filling.

The finished yogurt can vary in known manner in fat content and the yogurt base can optionally include specific formulations so as to provide nonfat (i.e., less than 0.5% butterfat), low fat (i.e., about 1.5% fat), reduced fat (about 2% fat), or full fat (about 3.5% fat) yogurts. The yogurt base can thus include such dairy ingredients such as whole milk, partially skimmed milk, skim milk, nonfat dry milk and the like. The yogurt base, before the addition of bulky flavors and/or sweeteners, contains about 0.1% to 4% milkfat and not less than 12% milk-solids-not-fat ("MSNF"), and has a titratable acidity of not less than 0.9%, expressed as lactic acid.

Milk of various mammals is used for yogurt making in various parts of the world. However, most of the industrialized production of yogurt uses cow's milk. The fortification of milk-solids-not-fat fraction concentration to about 12% from milk native levels is conveniently accomplished with added nonfat dry milk or condensed skim milk. The yogurt base can also comprise other milk types as an ingredient such as partially defatted milk, condensed skim milk, cream, and nonfat dry milk. In rare practice, milk may be partly concentrated by removal of 15% to 20% water in a vacuum pan or other physical means. Supplementation of milk-solids-not-fat with nonfat dry milk is the preferred industrial procedure. The increased protein content in the mix results in thicker consistency following the fermentation period.

Optionally, the yogurt base can comprise, and the requisite level of MSNF can include such other milk fraction ingredients as buttermilk, whey, lactose, lactalbumins, lactoglobulins, or whey modified by partial or complete removal of lactose and/or minerals, to increase the nonfat solids content, provided, that the ratio of protein to total nonfat solids of the food, and the protein efficiency ratio of all protein present shall not be decreased as a result of adding such ingredients.

The present dairy products further essentially comprise and the yogurt base contains sufficient amounts of the selected stabilizer(s) blend or yogurt thickener(s) to assist the setting of the gel and thus provide viscosities at filling temperature ("Tf" 40° ±5° F.) ranging from about 15,000 to 25,000 cps so as to enable the filling step described below. Secondary benefits of using the stabilizer blend in the present yogurt include product smoothness in body and texture, to impart a fat-like attribute, to increase gel structure and reduce wheying off or syneresis. Stabilizers function through their ability for form gel structures in water, thereby leaving less free water for syneresis. In addition, some stabilizers complex with casein.

Good results are obtained when the stabilizer blend collectively comprises about 1.6% to about 3.8% of the yogurt base product or the yogurt portion of the yogurt/fruit puree blend. Preferred yogurts comprise about 2.1% to 3.3% stabilizer blend. For best results, the stabilizer blend ranges from about 2.3% to 2.7%. Excessive concentrations can result in undesirable reductions in gel stability which is evidenced by reductions in viscosity.

If insufficient amounts of stabilizer are employed, then the yogurt's filling viscosity may be insufficient to realize the present stable layered polyphasic products.

Useful herein as the stabilizer system is a blend of high bloom strength gelatin and certain modified high amylose cook-up starches.

A high bloom strength gelatin is the first component of the present defined stabilizer system. Gelatin is derived by irreversible hydrolysis of the protein collagen. Gelatin is used herein at a level of 0.1% to 0.8% of the yogurt base to get a smooth shiny appearance in refrigerated yogurt. Preferred for use herein is a gelatin use level ranging from about 0.1% to about 0.50%. The term "Bloom" refers to the gel strength as determined by a Bloom gelometer under standard conditions. Gelatin of a Bloom strength of 150 or 250 (the unit "g" is thus understood) is useful herein. Gelatin tends to degrade during processing at ultra high temperatures and its activity is temperature dependent. At temperatures below 10° C., the yogurt acquires a thick viscous consistency.

The yogurt further essentially comprises a viscosity building modified starch as a second component of the present essential stabilizer system. The yogurt base essentially comprises about 1.5% to 3%, preferably about 1.8% to 2.3% of the starch, and for best results about 2%.

Useful herein as the texture modifying starch are modified high amylopectin waxy maize cook-up starch such as a starch available from National Starch Co. under the trade names "Thermflo" or "Purity W" or a modified tapioca starch available under the trade name "Frigex." Also useful is a modified waxy maize starch available from A. E. Staley & Co., under the trade name "Resista." Such starches are generally modified in known manner. The term "cook-up" is used in its conventional sense to refer to a starch that requires heat to gelatinize and to cause a viscosity increase.

Optionally, the yogurt base can additionally comprise modest amounts of additional supplemental stabilizers. Useful optional stabilizers can include gum acacia, carrageenan, gum karaya, pectin, gum Tragacanth, xanthan, and mixtures thereof. The precise levels of use for the gums will depend upon a variety of factors. Most importantly, supplemental stabilizer selection and usage level is dependent upon the filling viscosity range for the yogurt as described in detail below. Good results can be obtained when the supplemental stabilizers are employed at collective usage levels ranging from about 0.1% to 2%.

These supplemental stabilizers are well known food ingredients and are commercially available. A good description of stabilizers is found in "Industrial Gums, Polysaccharides and Their Derivatives," 2nd Ed., ed by Roy L. Whistler et al., 1973 Academic Press. (See also "Gums and Stabilizers for the Food Industry," edited by Glyn O. Phillips et al., 1988 IRL Press.

Certain gums are generally desirably avoided for use herein due to development of undesirable product attributes when such gums are included in the present yogurt products. The present products thus are essentially free (i.e., <0.1%) of such deleterious gum materials as locust bean gum.

The yogurt base can optionally further comprise a nutritive carbohydrate sweetening agent(s). Exemplary useful nutritive carbohydrate sweetening agents include, but are not limited to, sucrose, high fructose corn syrup, dextrose, various DE corn syrups, beet or cane sugar; invert sugar (in paste or syrup form); brown sugar, refiner's syrup; molasses (other than blackstrap); fructose; fructose syrup; maltose; maltose syrup, dried maltose syrup; malt extract, dried malt extract; malt syrup, dried malt syrup, honey; maple sugar, except table syrup and mixtures thereof.

These nutritive sweeteners exert osmotic pressure in the system, leading to progressive inhibition and decline in the rate of acid production by the culture. Being a colligative property, the osmotic based inhibitory effect would be directly proportional to concentration of the sweetener and inversely related to the molecular weight of the solute. In this regard, solutes inherently present in milk solids-non-fat part of yogurt mix accruing from starting milk and added milk solids and whey products would also contribute toward the total potential inhibitory effect on yogurt culture growth.

The yogurt base can optionally additionally comprise modest levels of whey protein concentrate ("WPC"). Especially useful herein are those WPC's that are low in lactose content, i.e., having a protein content of >34% and preferably >50%. If present, WPC can be included at levels ranging from about 0.1% to 5%.

Good results in terms of balancing desired sweetness against yogurt growth inhibitory effects are obtained when the added nutritive carbohydrate sweetening agent level is between about 8% to 14%, preferably about 10% to 12% and, for best results, about 12% of the overall sweetened yogurt.

The various dry ingredients, preferably preblended, and wet ingredients are blended together to form an homogeneously blended yogurt base.

The yogurt base can then optionally be deaerated and homogenized as indicated respectively by reference numerals 14 and 18. Certain highly preferred method embodiments herein do not require deaeration. In highly preferred embodiments, the yogurt base is heated to about 150° to 160° F. prior to homogenization to improve the effectiveness of the homogenization step.

Pasteurization and Cooling

Thereafter, whether or not deaerated, heated and homogenized as in the preferred practice, the present yogurt preparation methods further comprise the essential step of pasteurizing the yogurt 20. As is well known, pasteurization 20 is a temperature and time dual parameter process. Preferred conditions herein to pasteurize the yogurt base are to heat the yogurt base to apx. 190° F. for about five minutes, although other pasteurization conditions and times can also be used. Thereafter, the pasteurized yogurt base is rapidly cooled 22 to culturation temperatures in preparation for preparing the yogurt.

Inoculating and Fermenting

The next essential step in the present yogurt preparation is culturation 24 of the pasteurized yogurt base. The culturation 24 step includes the two substeps of inoculation or adding a live yogurt culture 26 to form an inoculated yogurt base and then fermenting or incubating the inoculated yogurt base 28. For good results, about 2% to 6%, preferably about 3% to 5%, of the yogurt culture is added to form the yogurt.

The medium for bulk starter production in most yogurt plants is antibiotic-free, nonfat dry milk reconstituted in water at 10% to 12% solids level. The starter medium is not generally fortified with growth activators like yeast extract, beef extract, protein hydrolysates because they tend to impart undesirable flavor to the starter and eventually yogurt. Following reconstitution of nonfat dry milk in water, the medium is heated to 90° to 95° C. (194° to 203° F.) and held for 30 to 60 minutes. Then the medium is cooled to 43° C. ±2° (110° F.) in the vat. The frozen can is thawed by placing the can in cold or lukewarm water containing low levels of sanitizer until the contents are partially thawed.

The inoculated yogurt base (e.g., 95% yogurt base, 5% added culture) is then incubated to allow the live yogurt culture to ferment to form the yogurt. The incubation period for yogurt ranges from 4 to 6 hours and at temperatures of 100° to 115° F. (apx. 43° C.). The fermentation must be quiescent (lack of agitation and vibrations) to avoid phase separation in the yogurt base following incubation. The progress of fermentation is monitored by titratable acidity ("T.A.") measurements at regular intervals until the desired final acidity is obtained.

Mixing

Thereafter, the yogurt is then essentially mixed 30 to form a stirred style yogurt. The mixing can be performed either partially or fully, either before or after the cooling arrest step 32 as indicated in FIG. 1. The mixing step 30 is intended to blend the yogurt to impart a smooth texture and mouthfeel to the yogurt body. In those certain preferred embodiments employing a high potency sweetener, this step 30 preferably further essentially includes a substep (not shown) of adding a high potency sweetener prior to cooling. By adding the high potency sweetener (e.g., aspartame, acetylsulfame K, sucralose, saccharine, cyclamate, and mixtures thereof, in their soluble salt(s) forms) to the warm yogurt, a more uniformly sweetened end product is obtained especially when aspartame is used as a high potency sweetener. Aspartame dissolves poorly in cooled aqueous products. Also, when the cooling step 30 is practiced employing a shell and tube heat exchanger, the cooling step provides homogeneous blending of the sweetener.

Cooling to Arrest Culturing

In the present method 10, once the yogurt has reached the targeted acidity level, an essential step is to arrest the yogurt culture growth by cooling the yogurt 32. When the titratable acidity ("T.A.") is 0.85% to 0.90%, the fermentation is terminated by the cooling step 32.

Good results are obtained when the yogurt is cooled to a temperature of about 2° to 4° C. (35° to 40° F.), preferably about 38° F. to 42° F. and, for best results, about 40° F.

Forming a Blended Yogurt

The present method further essentially comprises the step of blending 34 the cooled yogurt immediately thereafter (i.e., without resting) with additives such as fruit and/or fruit puree, colorants, flavorants, high potency sweeteners (e.g., aspartame, acetylsulfame, sucralose, saccharine, cyclamate and mixtures thereof, in the salts), vitamins, minerals, especially calcium salts (e.g., tricalcium phosphate and/or other dispersible calcium salts) to form a yogurt phase in order to enhance consumer acceptance of the product. These additives are typically added after the fermentation step is arrested by cooling. Optionally, but less preferably, the high potency sweeteners are added in this step.

Conventionally, the yogurt is unaerated. That is, the yogurt phase(s) can have a density of from about 0.9 to 1.2 g/cc.

The yogurt phase stream can be partitioned 22 into a plurality of portions each of which is distinguished by having a distinct difference in color and, optionally, additionally in flavor. As depicted in FIG. 1, it is convenient to partition the yogurt phase stream into two substreams A and B. As there indicated, the substreams can then each separately be blended with additional color and flavor characterizing ingredients.

In certain embodiments of the present invention, the stirred style yogurt phase can additionally comprise about 0.1% to 25% of the product of fruit preserves dispersed throughout the yogurt phase. The term "yogurt phase" is used herein broadly to include both the yogurt alone (i.e., with non-fruit additives dispersed or dissolved in the yogurt) or the yogurt (with other additives) mixed with fruit puree.

At least one portion of the present blended yogurt phase further essentially comprises an effective amount of a non-bleeding colorant. Good results are obtained when the colorant comprises about 0.01% to 0.5%, preferably 0.05% to 0.25% of the yogurt phase. In preferred embodiments, those yogurt phases that additionally include a fruit puree further include the non-bleeding colorant. By "non-bleeding" colorant, it is meant herein that the colorant resists rapid interphase migration. Such migration undesirably weakens the color of the colored phase from which the colorant migrates and discolors the phase to which the colorant does migrate.

Useful colorant materials herein are non-bleeding colorants including FD&C lake colorants, FD&C water soluble colorants, annatto, tumeric, and mixtures thereof. In contrast, bleeding, water soluble colorants are to be avoided herein since these colorants tend undesirably to migrate between the differently colored yogurt phases. Undesirable bleeding colorants include for example, beet juice, red cabbage juice, anthocyamin/beta cyamin, carmine or grape juice(s). The skilled artisan will have no difficulty selecting useful colorants, especially since relatively few colorants are legally permissibly added to yogurt.

While not wishing to be bound by the proposed theory, it is speculated herein that the described colorants form relatively stable complexes with the casein protein component. Such complexing renders the colorant materials relatively resistant to transport by moisture migration, especially in the high viscosity stirred style yogurt compositions herein. Since moisture migration is the primary vector to material migration, oil soluble colorants that exist in the form of fat globules are relatively unaffected and thus positionally stable.

Regardless of the mechanism, it has been surprisingly discovered that by employing the selected colorants as described, in the present high viscosity yogurts, yogurt phases exhibiting unexpectedly superior resistance to color migration can be provided.

For example, one portion identified by substream A in FIG. 1 can comprise a fruit puree and an appropriate color, e.g., blue for a blueberry puree containing blended yogurt, or red for a strawberry puree containing blended yogurt. Another portion, for example, substream B, may be uncolored, be free of added fruit puree and be flavored, for example with vanilla.

Charging a First Layer

Thereafter, a quantity of a first yogurt portion that is characterized by a particular color and preferably also by flavor is charged to a suitable yogurt cup or container. The first yogurt color may be white or uncolored so long as the second portion has a different color or hue. Conveniently, this filler stage 1 step can involve charging the yogurt to the bottom of a suitable container. It is essential herein that the first yogurt portion have a viscosity ranging from about 15,000 to 30,000 cps. For superior results in terms of minimizing intermixing between yogurt phases, the viscosity importantly ranges between 18,000 to 25,000 cps. For best results, the yogurt viscosity should range from about 20,000 to 25,000 cps. While yogurt is not a perfect Newtonian fluid, viscosity in centipoise is used as a practical tool to measure yogurt thickness.

The first yogurt phase has a temperature at filling importantly ranging from about 32° to 50° F. However, it is strongly preferred that the yogurt at filling has a temperature of about 40° F. ±5°.

If the viscosity is too low, then the separate yogurt portions tend undesirably to intermix and the yogurt phases can fail to layer. If, however, the viscosity value is excessive, i.e., >30,000 cps then the yogurt tends undesirably to exhibit an attribute called "coning." Coning involves the yogurt forming stiff peaks upon filling which prevents proper filling of additional layers or portions.

Additionally, it is important that the filling operation be performed so that the yogurt flow is laminar as opposed to turbulent flow. Failure to have laminar flow fill conditions result in the yogurt exhibiting viscosity breakdown. Further, laminar flow conditions greatly enhance the uniformity of the subsequent layers by reducing intermixing at the layer interface.

Thereafter, and importantly without adding an interjacent edible barrier, a second layer or portion is charged to the partially filled container. Conveniently, this stage 2 filler step can be to fill the middle of the yogurt container. Importantly, the second layer is essentially characterized by having a visually apparent distinct color or at least hue difference. Otherwise, the second yogurt portion can be compositionally similar to the first layer. Of course, the second layer can be compositionally different if desired. It is important, however, that the filling viscosity of the second layer be within the above described essential range. Moreover, the difference in filling viscosities between the two layers are essentially less than about 3,000 cps, preferably less than about 2,500 cps. It has been surprisingly discovered that maintenance of viscosity differences within this range is important to obtaining the benefit of visually distinct layers.

Thereafter, if desired, the present methods can comprise additional filling steps. For example, a third filler stage can be employed as depicted in FIG. 1 conveniently using the same yogurt composition as used in the first filler stage, e.g., to add a top layer to the yogurt.

The finished product so prepared is essentially characterized by being in the physical form of having a plurality of regions or portions, each characterized by a visually distinctive color.

After filling, the filled containers are applied with a lid or other closure, assembled into cases and entered into refrigerated storage for distribution and sale.

In the simplest and most preferred embodiment, in a style referred to herein as "parfait style" the layers are arranged one atop the other forming a vertically stacked series of horizontally extending layers. In another embodiment, so called herein as "neopolitan style," this orientation is rotated 90° to form a horizontally stacked series of vertically extending layers. In still another embodiment "bull's eye" style, the product is in the form of concentric rings about a central core. In still another embodiment so called herein as "barber pole" style, the yogurt portions are in the form of intermeshed spirals. Of course, other configurations of layers are possible and included within the scope of the present invention.

During refrigerated storage, the present multicolored yogurt products generally exhibit modest building in viscosities from the specified fill viscosities to their final viscosities observed at time of consumption. Generally, these finish viscosities can range from about 20,000 to 35,000 cps.

The multicolored stirred style yogurt products so prepared are highly visually distinctive and appealing. Moreover, the present yogurt products exhibit these appearance features in addition to having the desirable creamy texture and mouthfeel attributes of a stirred style yogurt. A surprising advantage is that the yogurts maintain the visually distinct feature for the full duration of ordinary shelf life (apx. 60 days) without unacceptable migration of colorants among the plurality of phases. Still another surprising advantage is that the visual distinctiveness among the phases is substantially maintained even with the jostling of normal shipping and handling.

The present invention is further illustrated by the following examples.

EXAMPLE 1

A non-fat, aspartame sweetened or "light" yogurt product of the present invention in the form of three horizontally extending layers vertically aligned was prepared having the following formulation:

| Ingredient | Weight % |
| --- | --- |
| Cream | 0.20 |
| Skim milk | 89.30 |
| NFDM | 1.68 |
| Aspartame | 0.05 |
| Starch[1] | 2.83 |
| Gelatin[2] | 0.47 |
| Culture | 4.97 |
| Vanilla Flavor | 0.50 |
| | 100.00% |

[1] A modified Waxy Maize Starch available from the National Starch and Chemical Corporation under the trade name THERMTEX.
[2] A high bloom strength gelatin available from Vyse Gelatin Co.

A yogurt base was first prepared by combining the several ingredients except for the aspartame and the culture. A preblend of the dry ingredients was added to the fluid milk ingredients and then mixed to form a uniform yogurt base.

The yogurt base without deaeration was then warmed to about 155° F. The warmed yogurt base was then homogenized in a two-stage homogenizer at a pressure of about 1,000 psig. The homogenized yogurt base was then pasteurized by heating to a temperature of 190° F. and held for six minutes. Next, the pasteurized yogurt base was rapidly cooled to 110° F. The yogurt culture was then added to form the inoculated yogurt base. The inoculated yogurt base was then quiesiently cultured for about 3 hours to form the yogurt.

When the yogurt had reached its desired titratable acidity of about 1.0, apx. pH 4.0, the yogurt was then mixed to form a stirred style yogurt. The aspartame solution was added and the now sweetened yogurt was cooled to a temperature of about 42° F.

The yogurt was then partitioned into two streams of about two-thirds and one-third respectively. The first stream was then admixed with 0.4% of strawberry puree and natural strawberry flavor, and 0.12% non-bleeding colorant (comprising a mixture of FD&C red No. 40, FD&C yellow No. 5 and FD&C blue No. 1) to form a reddish colored and strawberry flavored base. About 2 oz. of the reddish colored base was then charged to the bottom of a 6 oz. container. The colored yogurt had a temperature of about 42° F. and a filling viscosity of about 22,000 cps. Then, about an additional 2 oz. of the second, vanilla flavored and uncolored yogurt base was added to the container immediately on top of the first colored yogurt layer without an interjacent barrier. The temperature of the second layer was about 42° F. and had a viscosity of about 22,000 cps.

Finally, a third top portion of the reddish yogurt layer was added immediately on top of the whitish second layer without an interjacent barrier. The top layer, being of the same composition as the bottom layer, had the same viscosity and temperature at filling.

The so-formed three layer yogurt product was then capped and placed into refrigerated storage.

Samples of the product were withdrawn over the product's six week shelf life and visually examined. Minimal mixing or bleeding of the color was observed.

Yogurt products of equivalent layer stability and color migration attributes are obtained when the low-fat yogurt above is substituted with an equivalent amount of a nonfat yogurt, a reduced fat yogurt or a full fat yogurt.

Yogurt products of equivalent appearance, texture and phase color stability are obtained when the live culture additionally includes L. acidophilus and/or L. bifidus.

EXAMPLE 2

A three layered stirred style, blueberry flavored reduced fat yogurt product of the present invention is prepared as follows.

A standard 2% low fat milk is prepared including a milk solids nonfat ("MSNF") of 14.82% and having total solids of 16.82%. This standardized low fat milk is combined with the following formulation to prepare a yogurt base.

| Ingredient | Weight % |
| --- | --- |
| Standardized milk | 85.71 |
| Sugar | 11.79 |
| Starch[1] | 1.95 |
| Gelatin | 0.55 |
| | 100.00% |

[1] A modified tapioca starch available from The National Starch and Chemical Co. under the trade name THERMFLO.

The yogurt base is then deaerated, warmed, homogenized, pasteurized and cooled as in Example 1.

The pasteurized yogurt base is then inoculated with a culture as follows:

| Ingredient | Weight % |
| --- | --- |
| Pasteurized yogurt base | 95.00 |
| Culture | 5.00 |
| | 100.00% |

The inoculated yogurt base is then cultured and further processed as in Example 1.

A two-thirds portion of the yogurt is combined with the following ingredients to form a blueberry flavored and colored yogurt phase.

| Ingredient | Weight % |
| --- | --- |
| Yogurt base | 95.22 |
| Blueberry puree | 0.20 |
| Natural blueberry flavored syrup | 4.50 |
| Blueberry color[2] | 0.08 |
| | 100.00% |

[2] A blueberry color solution comprised of a blend of water, FD & C Blue #1, citric acid and sodium benzoate purchased from Crompton and Knowles.

About 2 oz. of the blueberry flavored and colored yogurt phase is charged to an opaque 6 oz. yogurt container forming a blueberry bottom layer. The viscosity at filling is about 25,000 cps and the temperature was about 42° F.

A second, one-third portion is combined with flavor but no colorant as follows:

| Ingredient | Weight % |
| --- | --- |
| Yogurt base | 99.25 |
| Vanilla | 0.75 |
| | 100.00% |

About 2 oz. of the natural white colored vanilla flavored yogurt phase is then added on top of the blueberry layer. The vanilla yogurt phase had a viscosity of about 25,000 cps and a temperature of 42° F.

Next, 2 oz. of the blueberry phase was added immediately upon the vanilla layer to form a top blueberry layer.

After two weeks of refrigerated storage, the final viscosity is about 30,000 cps.

Substantially similar yogurt products are obtained when the blueberry puree, color and flavor are substituted with equivalent amounts of peach, raspberry, cherry, or strawberry puree, flavor and color.

EXAMPLE 3

A multicolored yogurt product is prepared in a method similar to Example 2 except that the yogurt is prepared as follows:

A yogurt base is prepared having the following formulation:

| Ingredient | Weight % |
| --- | --- |
| Butterfat | 1.74 |
| Milk solids non-fat | 12.12 |
| Sucrose | 11.78 |
| Starch[1] | 1.65 |
| Gelatin | 0.05 |
| Moisture | 72.66 |
| | 100.00% |

The yogurt base was processed substantially as described in Example 1 to form a yogurt having a titratable acidity of 1.0%. The yogurt was further processed as described in Example 1 at the filling step, both the first and second yogurt phase streams had a viscosity of about 15,000 cps.

What is claimed is:

1. A method of making a multicolored yogurt product exhibiting resistance to color migration and intermixing of color, comprising the steps in sequence of:

A. preparing a yogurt base comprising:
      1. sufficient amounts of milk ingredients to provide a total milk solids concentration of at least 12%, and
      2. sufficient amounts of a yogurt thickener blend in an amount effective to provide a viscosity in step H of about 15,000 to 30,000 cps;
   B. pasteurizing the yogurt base to form a pasteurized yogurt base;
   C. cooling the pasteurized yogurt base to a temperature of 100° to 115°F.;
   D. inoculating the yogurt base with a yogurt culture to form an inoculated yogurt base;
   E. incubating the inoculated yogurt base to form a yogurt;
   F. mixing the yogurt to form a stirred yogurt;
   G. partitioning the stirred yogurt into a first portion and a second portion;
   H. adding a first non-bleeding colorant to the first yogurt portion to form a first colored yogurt phase;
   I. charging a quantity of the first colored yogurt to a container at a temperature of 35° to 45° F. and a viscosity of about 15,000 to 30,000 cps to form a horizontally extending yogurt phase; and thereafter
   J. charging a second quantity of the second yogurt phase to the container at a temperature of 35° to 45° F. and a viscosity of about 15,000 to 30,000 cps in direct physical contact with the first colored yogurt to form a yogurt product having discrete unmixed separately colored yogurt phases; and,
      wherein the difference in viscosity between yogurt phases is less than about 3,000 cps wherein the first and second yogurt phases are disposed in the container in the form of vertically arranged horizontally extending layers; and K. maintaining the yogurt product at refrigerated temperatures.

2. The method of claim 1
wherein step A further includes the substep of homogenizing the yogurt base, and
wherein in step B the pasteurization involves heating the homogenized yogurt base to a temperature of about 190° to 195° F. (87.7° to 90.6° C.) for a time sufficient to effect pasteurization.

3. The method of claim 2
wherein the yogurt base comprises:
   1. about 14% to 18% milk solids,
   2. about 1.5% to 3.0% of a modified starch, and
   3. about 0.1% to 0.8% of gelatin having a bloom strength of 200.

4. The method of claim 3
wherein the first yogurt phase comprises:
   1. about 90% to 99% of yogurt,
   2. about 0.1% to 10% of a fruit puree, and
   3. about 0.01% to about 0.25% of a non-bleeding colorant.

5. The method of claim 4
wherein the first yogurt phase has a viscosity ranging from about 18,000 to 25,000 cps, and
wherein the second yogurt phase has a viscosity ranging from about 18,000 to 25,000 cps.

6. The method of claim 5
wherein the first and second yogurt phases each comprise a yogurt including:
   1. at least 12% by weight of the yogurt of milk solids nonfat,
   2. about 0.1% to 4% by weight butterfat,
   3. wherein the combined amount of starch and gelatin is at least 3% by weight of the yogurt,
   4. an effective amount of a high potency sweetener or a nutritive carbohydrate sweetening agent to sweeten the yogurt, and moisture, and
wherein the second yogurt phase has a natural white color.

7. The method of claim 6
wherein step E is practiced by maintaining the inoculated yogurt base at a temperature of 90° to 120° F. for a time sufficient to produce a pH of about 3.8 to 4.8 and a titratable acidity of about 0.9 to 1.2.

8. The method of claim 7
wherein the yogurt product additionally includes a third yogurt phase disposed within the container in direct contact with at least one other yogurt phase, having an initial viscosity of about 15,000 to 30,000 cps and a temperature of about 35° to 45° F.

9. A method of making a multicolored yogurt product exhibiting resistance to color migration and intermixing of color, comprising the steps of:
   A. disposing within a container a quantity of a first yogurt phase having a first yogurt phase color, having an initial viscosity of about 15,000 to 30,000 cps and having a temperature of about 35° to 45° F. to form a first horizontally extending yogurt layer;
   B. adding a quantity of a second yogurt phase having a second yogurt phase color, having an initial viscosity of about 15,000 to 30,000 cps and having a temperature of about 35° to 45° F. to form a second overlaying horizontally extending yogurt layer to form a layered yogurt product having at least two horizontally extending vertically arranged unmixed yogurt phases,
   wherein the first yogurt phase is in direct physical contact with the second yogurt phase,
   wherein the difference in viscosity between the first yogurt phase and the second yogurt phase is less than 3,000 cps, and
   C. maintaining the yogurt product at refrigerated temperatures.

10. The method of claim 9
wherein each yogurt phase comprises:
   1. about 14% to 18% milk solids,
   2. about 1.5% to 3.0% of a modified starch, and
   3. about 0.1% to 0.8% of gelatin having a bloom strength of 200.

11. The method of claim 10
wherein the first yogurt phase comprises:
   1. about 90% to 99% of yogurt,
   2. about 0.1% to 10% of a fruit puree, and
   3. a non-bleeding colorant.

12. The method of claim 11
wherein the first yogurt phase has a viscosity ranging from about 18,000 to 25,000 cps, and
wherein the second yogurt phase has a viscosity ranging from about 18,000 to 25,000 cps.

13. The method of claim 12
wherein the first and second yogurt phases each comprise a yogurt including:
   1. at least 12% by weight of the yogurt of milk solids nonfat,
   2. about 0.1% to 4% butterfat,
   3. wherein the combined amount of starch and gelatin is about 2.1% to 3.3%,
   4. an effective amount of a high potency sweetener or a nutritive carbohydrate sweetening agent to sweeten the yogurt, and
   5. moisture.

14. The method of claim 13
wherein the thickener includes about 0.1% to 0.5% of a high bloom strength gelatin, and
wherein each yogurt phase has a viscosity ranging from about 20,000 to 25,000 cps.

15. The method of claim 14
wherein the yogurt product additionally includes a third yogurt phase disposed within the container in direct contact with at least one other yogurt phase.

16. The method of claim 15
wherein the third yogurt phase is compositionally equivalent to the first yogurt phase, and
wherein the second yogurt phase has a natural white color.

17. The method of claim 16
wherein the first, second and third yogurt phases are disposed in the container in the form of vertically arranged horizontally extending layers.

18. The method of claim 16
wherein the first, second and third yogurt phases are disposed within the container in the form of concentric rings.

19. The method of claim 17
wherein in the first yogurt phase the non-bleeding colorant is selected from the group consisting of FD&C lake colorants, FD&C water soluble colorants, annatto, tumeric and mixtures thereof and is present at about 0.01% to 0.25% by weight of the first yogurt phase.

20. A multicolored refrigerated yogurt product having a plurality of regions of distinct colors, comprising:

A. a substantially opaque container;
B. a first yogurt phase disposed within the container having a first color, said first yogurt phase comprising a stirred style yogurt in the form of a horizontally extending first layer including sufficient amounts of a yogurt thickener to provide the first yogurt phase with a viscosity upon being disposed therein ranging from about 15,000 to 30,000 cps at a temperature of about 41° F.±3.6°;
C. a second yogurt phase disposed within the container in direct physical contact with the first yogurt phase, said second yogurt phase being in the form of a second overlying horizontally extending layer having a second color distinct from the first color comprising a stirred style yogurt including sufficient amounts of a yogurt thickener to provide the second yogurt phase with a viscosity upon being disposed therein ranging from about 15,000 to 30,000 cps at a temperature of about 41° F.±3.6°; and
wherein the difference in viscosity between the first and second yogurt phases is <3,000 cps.

21. The yogurt product of claim 20
wherein each yogurt phase comprises:
1. about 14% to 18% milk solids,
2. about 1.5% to 3.0% of a modified starch, and
3. about 0.1% to 0.8% of gelatin having a bloom strength of 200.

22. The yogurt product of claim 21
wherein the first yogurt phase comprises:
1. about 90% to 99% of yogurt,
2. about 1% to 10% of a fruit puree, and
3. a non-bleeding colorant.

23. The yogurt product of claim 22
wherein the first yogurt phase has a viscosity ranging from about 18,000 to 25,000 cps, and
wherein the second yogurt phase has a viscosity ranging from about 18,000 to 25,000 cps.

24. The yogurt product of claim 23
wherein the first and second yogurt phases each comprise a yogurt including:
1. at least 12% by weight of the yogurt of milk solids nonfat,
2. about 0.1% to 4% by weight butterfat,
3. wherein the combined amount of starch and gelatin is about 2.1% to 3.3% by weight of the yogurt,
4. an effective amount of a high potency sweetener or a nutritive carbohydrate sweetening agent to sweeten the yogurt, and moisture, and
wherein the second yogurt phase has a natural white color.

25. The yogurt product of claim 24
wherein the yogurt product additionally includes a third yogurt phase disposed within the container in a horizontally extending layer in direct contact with at least one other yogurt phase, said third yogurt phase having an initial viscosity of about 15,000 to 30,000 cps and having a temperature of about 35° to 45° F.

26. The yogurt product of claim 25
wherein in the first yogurt phase the non-bleeding colorant is selected from the group consisting of FD&C lake colorants, FD&C water soluble colorants, annatto, turmeric and mixtures thereof and is present at about 0.01% to 0.25% by weight of the first yogurt phase.

* * * * *